United States Patent [19]

Boggan

[11] Patent Number: 4,943,707
[45] Date of Patent: Jul. 24, 1990

[54] TRANSACTION APPROVAL SYSTEM

[75] Inventor: Elvis W. Boggan, Concord, Calif.

[73] Assignee: Visa International Service Association, San Mateo, Calif.

[21] Appl. No.: 295,548

[22] Filed: Jan. 10, 1989

Related U.S. Application Data

[63] Continuation-in-part of Ser. No. 596, Jan. 6, 1987, Pat. No. 4,822,985.

[51] Int. Cl.⁵ .............................................. G06K 5/00
[52] U.S. Cl. .................................................... 235/380
[58] Field of Search ..................... 235/380, 382, 382.5, 235/379; 380/24

[56] References Cited

U.S. PATENT DOCUMENTS

| | | | |
|---|---|---|---|
| 3,696,335 | 10/1972 | Lemelson | 340/149 A |
| 3,798,602 | 3/1974 | Hynes, Jr. | 340/149 A |
| 4,186,871 | 2/1980 | Anderson et al. | 380/24 |
| 4,472,626 | 9/1984 | Frid | 235/380 |
| 4,558,211 | 12/1985 | Berstein | 235/380 |
| 4,679,236 | 7/1987 | Davies | 235/380 |

Primary Examiner—Roy N. Envall, Jr.
Attorney, Agent, or Firm—Limbach, Limbach & Sutton

[57] ABSTRACT

An improved system is disclosed for detecting invalid transaction cards at remote transaction terminals. The system includes providing each terminal with a master table having data corresponding to invalid cards. The data in the master table is less than the actual account numbers of the invalid cards. By using a compressed version of the data, the file can be shortened to facilitate storage and transmission. The compressed data file is arranged such that when an invalid card is presented, it will be identified and routed on for further processing. In the preferred embodiment, the probability that a valid card will be identified as potentially invalid is on the order of one to three percent. During each transaction, the master table is supplemented with information about the account number of the transaction card presented for the purchase. In this manner, any subsequent use of the card will be routed for additional processing. A scheme for compensating for data transmission errors is used to reduce the possibility that information about invalid cards is not lost when the master file is distributed.

9 Claims, 5 Drawing Sheets

BIT MAP

| BIT | 1 | 2 | 3 | 4 | 5 |
|-----|---|---|---|---|---|
| 0   | 0 | 1 | 0 | 1 | 0 |
| 1   | 0 | 0 | 1 | 1 | 0 |
| 2   | 1 | 1 | 0 | 1 | 1 |
| 3   | 1 | 0 | 1 | 0 | 1 |
| 4   | 0 | 0 | 1 | 1 | 1 |
| 5   | 1 | 1 | 0 | 0 | 1 |
| 6   | 0 | 1 | 1 | 0 | 1 |
| B-3 | 0 | 0 | 1 | 1 | 0 |
| B-2 | 1 | 0 | 0 | 1 | 1 |
| B-1 | 0 | 1 | 1 | 0 | 1 |

| ACCOUNT NUMBER | 0 | 3 | 5 | 8 | 2 | 3 | 1 | 4 | 2 | 7 | 8 | 7 |
|---|---|---|---|---|---|---|---|---|---|---|---|---|
| POSITION | 12 | 11 | 10 | 9 | 8 | 7 | 6 | 5 | 4 | 3 | 2 | 1 |

FIG. 3

TRANSACTION APPROVAL SYSTEM

RELATED APPLICATION

This application is a continuation-in-part of prior U.S. application Ser. No. 07/000,596, filed Jan. 6, 1987 now U.S. Pat. No. 4,822,985.

1. Technical Field

The subject invention relates to a financial transaction network. The invention includes an improved system for distributing information about invalid transaction cards.

2. Background of the Invention

In the last fifteen years the use of transaction cards as substitutes for cash has greatly expanded. Along with this expanded use has come an increase in losses due to fraud. One of the most costly problems is caused by the use of invalid cards. The term invalid card includes those cards which have been lost or stolen. The term can also include cards whose credit limits have been exceeded by the holder. Significant efforts have been made to minimize the use and abuse of invalid cards.

One of the earliest approaches used to combat this fraud was to distribute a printed list of invalid cards. One such list is called the Card Recovery Bulletin or CRB. In use, the merchant checks the account number on the card presented for the transaction with the account numbers printed in the CRB. If the account number is listed, the transaction would be declined.

This use of the CRB is effective in reducing a large percentage of fraud losses. Unfortunately, this approach has a few drawbacks. For example, a transaction card is often used almost immediately after it has been lost or stolen. This immediate use will occur before the card has been listed in the bulletin or before the bulletin has been distributed. Another problem with this approach is that from a practical standpoint, it is often difficult to insure that store clerks use the list properly or at all.

Because of these difficulties, many other more sophisticated approaches have been taken. One of the most effective schemes is to authorize every transaction through a real-time, on-line communications network. For example, the merchant can report the account number of the card presented for a transaction to a central processor by telephone. The account number on the card can then be checked against a current list of invalid card numbers stored either at the central processor or back at the card issuer. In another variation on this scheme, a transaction terminal is provided with a card reader which reads a magnetic stripe encoded with an account number. The terminal can then automatically transmit the account number to the central processor for approval.

This on-line scheme eliminates the lag time inherent in using the Card Recovery Bulletin. Unfortunately, a fully on-line system turns out to be prohibitively expensive and prone to communication delays. An on-line approach also does not provide any protection when the network is down.

More recently, many approaches have been taken to reduce transaction approval costs while also controlling fraud losses. As microprocessors become smaller, cheaper and faster, some of the transactional analysis can be performed at the terminal itself. Efforts have been made to develop screening procedures that avoid having to transmit the transaction information to the central processor. For example, the transaction terminal can be programmed to authorize every transaction below a certain dollar limit or floor limit. In this manner, the cost of communication can be balanced against the risk of loss.

The terminal may also be provided with the capability to verify a cardholder secret personal identification number or PIN. In this scenario, a version of the PIN is encoded onto the magnetic stripe on the card and read by the terminal. The terminal then compares the PIN read from the card with a PIN entered into a keypad on the terminal by the cardholder. If the two PINs match, the transaction can be approved. The use of PINs sharply reduces the fraudulent use of lost or stolen cards.

A more sophisticated approach is described in U.S. Pat. No. 4,734,564, issued Mar. 29, 1988, assigned to the same assignee as the subject invention and incorporated herein by reference. In this patent application, a system is described wherein risk assessment data is encoded onto the card by the card issuer. This risk assessment data is tailored to define the credit worthiness of each specific cardholder. This risk assessment data can be analyzed by the transaction terminal and if the transaction amount falls within the parameters encoded on the card by the issuer, the transaction can be automatically approved. If the transaction amount exceeds these parameters, the transaction information is routed on to the central processor for further analysis.

As the cost of computer memory space has decreased, the idea of storing the account numbers of invalid cards in each transaction terminal has been explored. If this scheme were implemented, the account number of the card being presented for the transaction could be automatically compared at the terminal. One prior art system which utilized this approach is described in U.S. Pat. No. 3,696,335, issued Oct. 3, 1972 to Lemelson.

The approach illustrated in the Lemelson patent has been deemed impractical for a number of reasons. More specifically, in order to keep the lists current, they would have to distributed to the terminals and updated on a frequent basis. With the number of transaction terminals rapidly expanding, it would be virtually impossible to physically transfer this data to the terminals on a routine basis. Therefore, distribution of the list of invalid account numbers must be through some type of communication link. Unfortunately, the lists of invalid cards are so large for the major transaction card systems that on-line distribution becomes quite difficult. However, if some way could be developed to distribute the list in an efficient manner, this approach could be very effective in reducing both communication costs and fraud losses.

One technique for attaining this goal is described in U.S. Pat. No. 4,558,211, issued Dec. 10, 1985 to Berstein. This disclosure acknowledges that a complete "hot card" list would be too large to transmit to each transaction terminal. The solution proposed in the latter patent is to add an identifier to each listed hot card which indicates the geographical location in which the card is most likely to be used. Subsets of the hot card list geared to specific geographical locations can then be generated. The greatly shortened lists can then be distributed to the terminals and stored. The patent suggests that a standard 4K byte memory in a terminal could hold a list of 800 invalid cards. Since most invalid cards are used in the area where they were lost or stolen, this approach could be very effective as long as only 800 invalid cards exist in any geographical area.

Unfortunately, major transaction card companies will typically have over one million invalid cards listed on any given day in the United States alone. Even when these lists are broken down geographically, the size of the smallest list does not fall much below 100,000 cards. Obviously, if the geographical area is made too small, the effectiveness of the system will be reduced since it will be limited to catching an unauthorized user only at the exact location the card was lost or stolen.

Accordingly, it is the object of the subject invention to provide a new system for distributing information about invalid cards.

It is another object of the subject invention to provide a new system for distributing lists of invalid cards which can be used to authorize transactions at a transaction terminal.

It is a further object of the subject invention to provide a new system for distributing lists of invalid cards in a cost effective manner.

It is still another object of the subject invention to provide a new system for rapidly distributing lists of invalid cards in an on-line manner.

It is still a further object of the subject invention to provide a new data file containing information about invalid cards that takes up very little memory space.

It is still another object of the subject invention to provide a compressed data file that can be easily transmitted to remote transaction terminals.

It is still a further object of the subject invention to proved a compressed data file which will always indicate when an invalid card has been presented and wherein the probability of identifying a valid card as a potentially invalid card is on the order of one to three percent.

It is still another object of the subject invention to provide a hot card authorization system that can easily be implemented in current microprocessor based remote transaction terminals.

It is still a further object of the subject invention to provide a compressed data file with information on an invalid transaction that is arranged in a manner such that the entire file does not have to be searched in order to determine if a particular account number is invalid.

It is still another object of the subject invention to provide means for detecting multiple uses of transaction cards.

It is still a further object of the subject invention to provide a means for supplementing the locally stored list of invalid cards with cards that have been used at that location.

It is still another object of the subject invention to provide a means for compensating for errors in transmission of the list of cards.

It is still a further object of the subject invention to provide a means for compensating for ambiguous errors in the transmission of a list of invalid cards so that no information about the listed cards is lost.

SUMMARY OF THE INVENTION

In accordance with these and many other objects, the subject invention provides for a method for generating and distributing a master table containing information about invalid cards. A unique data compression method is used to substantially reduce the amount of memory needed to hold the master table. By reducing the size of the file, the downloading of the information to local transaction terminals is greatly facilitated.

The information contained in the master file is less than the actual account numbers of the invalid cards. Nonetheless, the data is so arranged that if an invalid card is presented to a transaction terminal, it will always be identified as requiring further analysis prior to approval. If the card is so identified, the account information can then be transmitted to a central processor for final confirmation against a complete invalid card list. Conversely, if an account number is tested against the master file at the transaction terminal and is cleared, the transaction can safely be approved off-line since this result insures that the account number is not listed in the invalid card file.

Because of the characteristics of the data compression system of the subject invention, a certain percentage of valid cards which are presented will be identified as potentially invalid. In such cases, the information about the transaction will be passed on to the central processor for absolute verification. The probability of a valid card being identified as potentially invalid can be adjusted by varying the characteristics of the master table. The probability of a valid card being identified as potentially invalid should be less than ten percent and preferably on the order of one to three percent. Since many transactions are transferred to the central processor for other reasons (i.e. high dollar amount transactions which exceed the floor limit of the terminal), the fact that a small percentage of transactions are sent to the central processor under this scheme will have an insignificant impact on overall system performance.

The master table is defined by a plurality of bit maps. As discussed in detail below, by using a plurality of bit maps in the master table instead of just one, the probability of a valid card being identified as potentially invalid can be reduced. Conversely, as the number of bit maps is increased, processing time is also increased.

Each of the bit maps in the table is B bits in length. Information about the invalid cards is represented by indicators within the bit map. In order to set the indicators, the account number of the invalid card is subjected to an algorithmic function to generate an index value between zero and the number of bits in the bit map. When this value is obtained, an indicator is placed in the location in the bit map corresponding to the index value that is generated. In the illustrated embodiment, where five bit maps are used, the account number is subjected to five different algorithmic procedures to generate five different index values, each of which is used to place an indicator in one of the five bit maps.

The algorithm used to generate an index value may be relatively sophisticated, such as the data encryption standard (DES). For greater speed and simplicity, selected digits of the account number can be mixed and added to generate an index value. The process of mathematically reducing the information content in a data stream is typically called "hashing".

The selected hashing procedures are repeated for each of the invalid cards on the list. When the table is complete, it is distributed to the transaction terminals. In the preferred embodiment, this list is downloaded by broadcast transmission to all terminals simultaneously. This list can be downloaded through any other suitable type of communication link.

In operation, the account number of the card presented for the transaction is read into the terminal. The terminal then performs the same algorithmic steps, or, hashing on the new account number that was done to create the table in the first place. An index value is generated for each bit map. The transaction terminal then determines if an indicator is present in each bit map in the master table corresponding to each of the newly generated index values. If any bit map does not contain an indicator, then the card is immediately known to be valid and the transaction may be approved off-line. If the comparison reveals that the indicators are present in every bit map, then there is a possibility that an invalid card has been presented. In this case, some form of further processing will be required. At that point, the transaction may be routed to the central processor for an absolute comparison of the account numbers against the entire list of invalid cards. If the transaction system happens to be down, a message may be relayed to the operator that the account number should be checked against a printed list. As pointed out above, the terminal will identify some small percentage of valid cards as potentially invalid but the results of further processing will indicate that those cards so identified are in fact valid and that the transaction should proceed.

It is estimated that a master table generated with the subject data compression system will be one-fourth to one-sixth the length of a list of actual invalid account numbers. This shorter file can be more easily transmitted and stored. Another advantage to this approach is that the entire table does not have to be scanned to determine if a card is valid. The index values are used to pinpoint specific locations in the table. As soon as such a location is encountered in which no indicator is present, the card in question is immediately known to be valid.

As can be appreciated, the subject system provides an improved method for determining if a transaction card has been reported lost or stolen or whether the holder has exceed the assigned credit limit. Unfortunately, even with the subject system, cards that have been identified as invalid, may not be present in each master table. In operation, a card which has just been reported stolen is immediately listed by the card issuer and central processor. However, the card may be fraudulently used before there has been an opportunity to provide an update in the master table at the remote terminal.

In order to further reduce this improper usage, the subject system may be configured to supplement the distributed hot card file with the account numbers of each card used at the local terminals. In operation, the account number of the card presented for the transaction would first be checked against the existing master table. If the account number is not present, the transaction could be approved for further processing. At the same time, indicators representative of the account numbers of the card being used will be entered into the master table. By this arrangement, any subsequent use of that card at the terminal will be identified as possibly invalid and sent on for further on-line processing. This approach prevents the card from being repeatedly used and avoiding more complete, on-line verification which would detect a card that had been listed at the central processor or issuer since the last distribution of the master table.

As noted above, the master table may be transmitted to the local terminals. Whenever data is transmitted errors will occur. Transmission errors are more frequent when broadcast technology is used and the remote terminals lie in fringe reception areas.

In the prior art, many techniques have been developed to detect and correct data transmission errors. Some systems simply require redundant transmissions and comparisons. In other cases, various parity and check digits are used to pinpoint transmission errors.

Such error detecting techniques may be used to correct some of the transmission errors that would be encountered in distributing the master table defined in accordance with the subject invention. However, many of these error detection techniques do not give unambiguous information on transmission errors. For example, they may give information as to which data bytes have errors but can not identify which bits within the byte are in error. In such a case, correction is not possible and the data block might have to be discarded.

In contrast, in accordance with the subject invention, where ambiguous transmission errors have been detected, a means is provided for compensating for those errors in a manner such that information about invalid cards is not lost. As noted above, invalid cards are listed in the bit map of the master table using indicators. If it is determined that certain bits may have been improperly transmitted, they can be modified by placing indicators in those bit locations. While this approach will increase the number of valid cards which are identified as possibly invalid, it will also minimize the risk that a card which should have been listed in the master table has been omitted. Thus, this approach substantially enhances the integrity of the transmitted file and protects against fraudulent usage of the cards.

BRIEF DESCRIPTION OF THE DRAWINGS

FIG. 2 is a representation of a master table having five bit maps.

FIG. 3 is a representation of the last 12 digits of an invalid account number.

DETAILED DESCRIPTION OF THE PREFERRED EMBODIMENT

Figure 1:
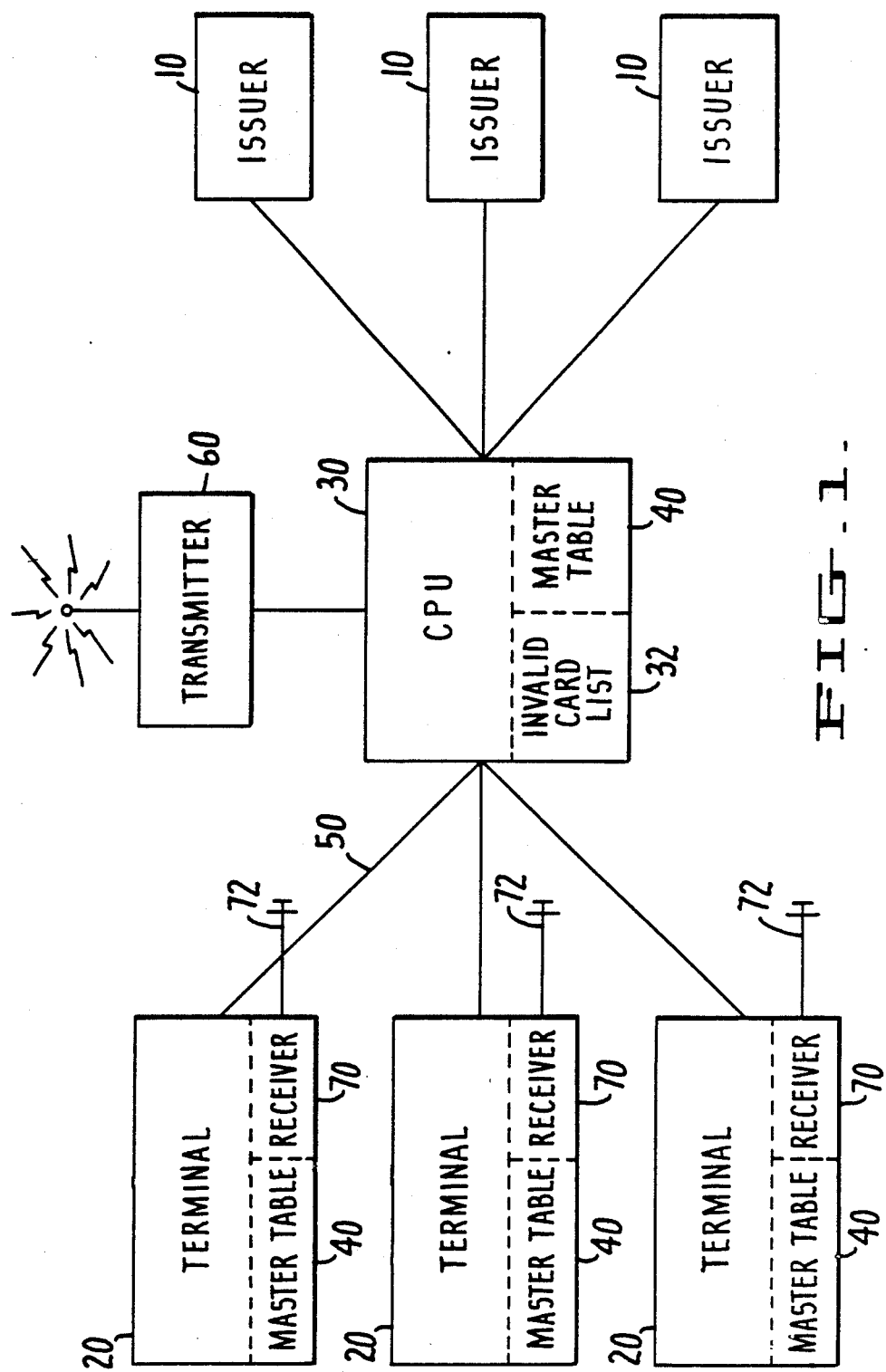
FIG. 1 is a schematic diagram illustrating a transaction network where the method of the subject invention can be implemented.

Referring to FIG. 1, there is illustrated a transaction network in which the subject invention may be implemented. As shown in FIG. 1, a transaction network typically will include one or more issuers 10 of transaction cards. The transaction cards are distributed to customers and will include an account number identifying the cardholder. The cards are presented to merchants for goods and services in lieu of cash.

The transaction is frequently authorized through the use of transaction terminals 20. There are a large number of transaction terminals publicly available and therefore they will not be described in detail herein. The current state of the art transaction terminal typically includes a card reader for reading account information and other data from the magnetic stripe on the transaction card. The terminal can also be provided with the ability to automatically dial and make an on-line connection to a computer located either at a merchant bank, a network switch or to one of the card issuers. For the purposes of this disclosure, block 30, labelled "CPU," is intended to correspond to a central processing unit having higher level decision-making authority. For example, the central processing unit 30 can have stored therein a full list of invalid cards 32 which may be consulted to determine if the transaction should be approved.

As discussed above, the transaction terminal 20 may be provided with the ability to perform some transactional analysis without connection to the main CPU 30. To carry out these functions, the terminals will include a microprocessor, dedicated ROMs, random access memories, a keypad and display. In order to perform the subject invention, some dynamic memory space must be allocated for holding the master table 40. In addition, a program must be provided for analyzing the account number presented with the data in the master table. The programming of a terminal to perform these functions is well within the abilities of one skilled in the software development art.

In accordance with the subject invention, the terminal 20 is capable of determining whether a card, presented for a transaction, is likely to be invalid. This result was achieved in the above cited U.S. Patents. In the prior art systems, actual invalid account numbers are supplied to each transaction terminal. The account number of the card presented is compared to the account numbers listed in the memory to determine if the transaction should be approved. In contrast, in the subject invention, a master table containing information less than the invalid account numbers is generated and supplied to the terminals. In this manner, meaningful data can be stored in less space. In addition, only precise locations in the table are searched to determine if the card is invalid.

In accordance with the subject invention, the information on the invalid cards is contained in a master table 40 generated at the central processor 30. An example of a master table 40 is shown in detail in FIG. 2. The master table consists of at least one bit map of B bits in length. Preferably, a plurality of bit maps are used. As will be seen below, by using a plurality of bit maps in the master table instead of just one, the probability of a valid card being identified as potentially invalid is decreased. In the illustrated embodiment of FIG. 2, five bit maps are used.

When selecting the length of the bit map, consideration should be given to maximizing the information content within the map. From a statistical analysis, it can be shown that greatest information content in a bit map occurs when roughly half the bits are zero and half the bits are one. Assuming that the algorithmic functions used to generate the table provide results with pseudo-random characteristics, the fraction of bits in a bit map which are zero is given by the following equation:

$$Z = [1 - (1/B)]^N \quad (1)$$

where Z is the fraction, B is the number of bits in the map and N is the number of invalid cards listed. Where each bit map is 200,000 bits in length, a distribution profile where half the bits are zero and half the bits are one (Z=0.5) would occur when about 138,000 account numbers are listed. In the illustrated embodiment, where roughly 100,000 cards are initially listed, the probability of any bit being a one is on the order of 0.4. In operation, as account numbers are added to the master table through an update procedure discussed below, the information content in the bit map will increase as the probability increases to 0.5.

In order to generate the table, the account numbers of the invalid cards are "hashed" to derive compressed data. An account number can be hashed by encrypting the number using the data encryption standard (DES) and a secret key. The resulting number can be truncated to an index value between zero and B-1. An indicator, (for example, a "one" if all the bits are originally set to "zero") can then be placed in the bit map at the location corresponding to the index value which has been generated by the algorithmic function. If more than one bit map is used, the account number could be encrypted again, using a different key. The result is truncated to obtain another index value which will be used to place an indicator in the second bit map. This process would be repeated, encrypting the account number one time for each bit map present in the master table. Each invalid card would then have one indicator in each of the bit maps. Similar steps would be performed for each invalid card, and indicators would be added into the table. If an indicator was already located at an index value from a previous card, this indicator would remain unchanged.

While the data encryption standard (DES) provides a method of hashing account numbers which has suitable pseudo-random characteristics, it is also time-consuming and complex. In the illustrated embodiment, a simpler and faster hashing algorithm is described which has an acceptable degree of pseudo-random characteristics. In this context, a pseudo-random algorithmic function will insure that any index value generated from the account number will have an equal probability of lying anywhere in the bit map. Furthermore, the results of the algorithmic function used with one bit map should not correspond in any way to the results of the algorithmic function used to generate a different bit map.

In the illustrated embodiment, these factors are balanced by selecting and combining small groups of digits in the account number to create index values. This approach can best be understood by referring to FIG. 3 and the tables below. FIG. 3 illustrates the last 12 digits of an account number 0358-2314-2787. The position of these digits has been labelled 1 to 12, from right to left. Where the bit map has 200,000 entries, index values between 0 and 199,999 must be generated. The most significant digit of that six-digit index value must be either a one or a zero. The remaining five digits must be between 0 and 9.

The first index value which will be used to place an indicator in the first bit map in FIG. 2, can be generated using Table I, which is merely intended to illustrate a suitable hashing function.

TABLE I

| INDEX VALUE DIGIT | ACCOUNT NUMBER POSITIONS | CORRESPONDING ACCOUNT DIGITS | INDEX VALUE |
|---|---|---|---|
| 1 | (4 & 5) | (2 + 4) | 0 |
| 2 | (1, 7 & 8) | (7 + 3 + 2) | 2 |
| 3 | (2, 4 & 9) | (8 + 2 + 8) | 8 |
| 4 | (2, 5 & 10) | (8 + 4 + 5) | 7 |
| 5 | (3, 6 & 11) | (7 + 1 + 3) | 1 |
| 6 | (3, 7 & 12) | (7 + 3 + 0) | 0 |

As seen from Table I above, the first digit is derived based upon whether the sum of two digits in the account number is even or odd. In this example, in index digit 1, the two account number digits selected (2, 4) are in the fourth and fifth position. Since 2 plus 4 is even, the first digit of the index value will be 0. Digit 2 of index 1 is the modulo 10 summation of the account number digits located at positions 1, 7 and 8, namely, 7, 3 and 2. The sum of 7+3+2 equals 12, with the modulo 10 sum being 2, such that digit 2 of the index value is 2. Similarly, digit 3 is the modulo 10 sum of 8+2+8 (positions 2, 4 and 9), which is equal to 8. Therefore, the third digit in the index is 8. The remaining digits are calculated in a similar manner to yield digits 7, 1 and 0. When read together, the index value for the account number in FIG. 3 is 028170. An indicator will then be placed in the first bit map at the 28,170th bit. If an indicator is already present at that bit from a previous table entry, no change will be made.

Similar index values are then calculated for each of the bit maps present in the master table. In the preferred embodiment with 5 bit maps, another four index values will be generated. A table will be used for each index value that is similar in structure, but different in content to the table illustrated above. The index digits selected for the tables will preferably be as different from each other as possible.

A second table (Table II) is set forth below as another illustrative example:

TABLE II

| INDEX VALUE DIGIT | ACCOUNT NUMBER POSITIONS | CORRESPONDING ACCOUNT DIGITS | INDEX VALUE |
|---|---|---|---|
| 1 | (2 & 6) | (8 + 1) | 1 |
| 2 | (4, 5 & 8) | (2 + 4 + 2) | 8 |
| 3 | (1, 3 & 9) | (7 + 7 + 8) | 2 |
| 4 | (3, 5 & 10) | (7 + 4 + 5) | 6 |
| 5 | (2, 7 & 11) | (8 + 3 + 3) | 4 |
| 6 | (4, 6 & 12) | (2 + 1 + 0) | 3 |

When the account number shown in FIG. 3 (0358-2314-2787) is hashed in accordance with the algorithm of Table II, an index value of 182,643 is generated. An indicator would then be placed in the 182,643rd bit of the associated bit map.

By generating a master table in this fashion, an indicator will be placed in each bit map for each invalid card. When the table is used to detect an invalid account number (a process described in greater detail below) an indicator must be present in each bit map tested, otherwise the card is known to be valid. The converse of this statement is not true. More specifically, even if an indicator is present in each bit map, the card might still be valid. As can be appreciated, as more invalid cards are listed in the table, and more indicators are added to the bit map based on the results of random algorithmic functions, the likelihood that indicators will be present for the index values obtained by hashing any account number will increase.

The probability that an unlisted valid account number will be identified as potentially invalid is given by the following formula:

$$P = [1 - (1 - 1/B)^N]^M \quad (2)$$

where P is equal to the probability, B is equal to the number of bits in each map, N is equal to the number of listed account numbers, and M is equal to the number of bit maps. In the arrangement shown herein, where five bit maps are used, each 200,000 bits long, if 200,000 account numbers are listed, the probability of a valid card being identified as potentially invalid would be on the order of 10.1 percent. If the file is reduced to 100,000 account numbers, the probability of identifying a valid card as potentially invalid drops to just below one percent.

The probability of identifying a valid card as potentially invalid can be varied by changing the total number of bit maps in the master table. Assuming that the length of the bit map has been adjusted to maximize information content (as discussed above) the probability that a valid account number will be identified as potentially invalid is given by the following equation:

$$P = \tfrac{1}{2}^M \quad (3)$$

This equation demonstrates that when five bits maps are used, the probability of identifying a valid card as potentially invalid is 1 in 32 or about 3.1 percent. In the illustrated embodiment, where only 100,000 cards are initially listed, the bit maps are not utilized to their full information carrying capacity and the probability of identifying a valid card as potentially invalid is just under one percent as noted above.

From a purely statistical analysis, if 100,000 invalid cards are to be listed in a master table one million bits long, seven bit maps should be used. To implement such a master table, a hashing algorithm which will randomly distribute information within seven bit maps, each 142,857 bits long, must be created. For practical reasons, five bit maps were selected for this illustration since a suitable hashing algorithm could be created more readily. Furthermore, while the use of five bit maps instead of seven in the master table will result in an increase in the percentage of valid cards that are identified as potentially invalid, this increase is relatively small and not considered unacceptable. Finally, the use of five bit maps allows the number of listed account numbers to increase to about 140,000 with the probability of identifying a valid card as potentially invalid increasing to only about 3.25 percent.

The effect of the subject data compression system can be compared with listing the actual account numbers in a memory. For the comparison, the least 12 significant digits of the account number are selected. Each 12 digit account number would require 48 bits of memory, assuming four bits per digit in a binary coded decimal format. In contrast, in the subject system, reasonable operation is achieved when the number of bits in the master table is roughly seven to ten times greater than the number of invalid account numbers to be listed. This represents a reduction in memory needs by roughly factor of five and balances the competing factors of limited memory and information content.

In practice, the list of invalid cards used to generate the table can also be trimmed with respect to the geographical location of the invalid cards in a manner similar to that described in the Berstein patent. However, rather than distributing these reduced lists as called for in the Berstein patent, the lists are used to generate a plurality of master tables which are then distributed geographically. In this manner, the total list of invalid cards, which may exceed one million in the United States alone, can be broken into regional subsets having a length on the order of 100,000 cards each. This master table can be one million bits or 125K-bytes long. 128 K dynamic RAM memories are readily available at relatively low cost and can easily store this size master table. More importantly, the reduced size of the master files simplifies and shortens the time necessary to transmit the information to the terminals.

The transmission of the master table to each individual terminal could be done along the same type of communication lines used to interconnect the terminal and the central processor unit for on-line authorizations. These lines are shown as 50 in FIG. 1. In this approach, a communication protocol must be established with each terminal to send the information. In the preferred embodiment of the subject invention, the master table 40 is broadcast over radio or television waves to the terminal. As shown in FIG. 1, the CPU is connected to a transmitter 60. Transmitter 60 generates electromagnetic waves which are received by the antenna 72 of receiver 70 provided in each terminal. The information received by the receiver is downloaded into memory in each terminal. Information on radio waves can be readily transmitted at 38,400 bits per second such that the entire one million bit master file could be transmitted in less than one-half a minute. This file could be generated and transmitted once a day so that the most current information on invalid cards is available to the terminals. If a television signal is used, the information can be inserted in the vertical blanking interval as is well known in the art.

If less frequent transmission of the entire master table is desired, the table can be updated with additions. For example, if the master table is transmitted weekly, updates could be transmitted on a daily basis. In this case, lists of additional invalid cards could be supplied to each terminal. Each newly transmitted invalid account number would be hashed by the individual terminal and indicators would be placed into the bit maps of the master table.

If the system is operated in a manner where a significant number of new entries are typically supplied to the terminal prior to retransmitting an entirely new master table, steps can be taken to reduce the transmission time of the updates. For example, when the table is initially created, each twelve digit account number could be "prehashed" to yield a seven digit number. This seven digit number would then be hashed to create index values in a manner similar to that described above. If the master table is created in this manner, only the seven digit, prehashed account numbers, rather than the full twelve digit numbers, would have to be supplied to the transaction terminals when the master table is updated. This approach would shorten transmission time by almost one-half.

It should be noted that while individual account numbers can be added to the master table, individual account numbers cannot be deleted. As can be appreciated, any time a file is created by data compression, there will be duplicates or overlapping entries. Therefore, even if a particular card has regained valid status (or the listing period has expired), the indicators could not be safely removed from the file without unintentionally destroying other meaningful data.

Effective deletion of account numbers can only be achieved by transmitting a newly generated master file. Transmission of a new master file should occur before the number of account numbers listed in the file, as increased by updates, (or card usage as discussed below) reaches a level where an unacceptable percentage of valid cards are being identified potentially invalid.

Other methods of providing interim file updates are possible. For example, a new master table can be created at the central processor utilizing the most current list of invalid cards. The new master table can then be compared with the old master table and information about the differences can be distributed. As noted above, updates of the master table must be limited to adding information about newly listed cards. In this case, newly listed cards are represented in the new master table by bits set to logic "one" which had previously been set to logic "zero." Updates to the file can be made by transmitting the addresses of any bits which have been changed to logic "one." The processor in the terminal can then set the identified bits to logic "one" in the locally stored version of the master table.

It is estimated that if the entire file is transmitted weekly with an update transmission every day, the total amount of data transmitted can be reduced by over sixty percent. Even so, transmitting the entire file on a daily basis is preferred since any newly installed terminal must receive an entire master file, rather than an update, in order to be brought into service.

Figure 4:
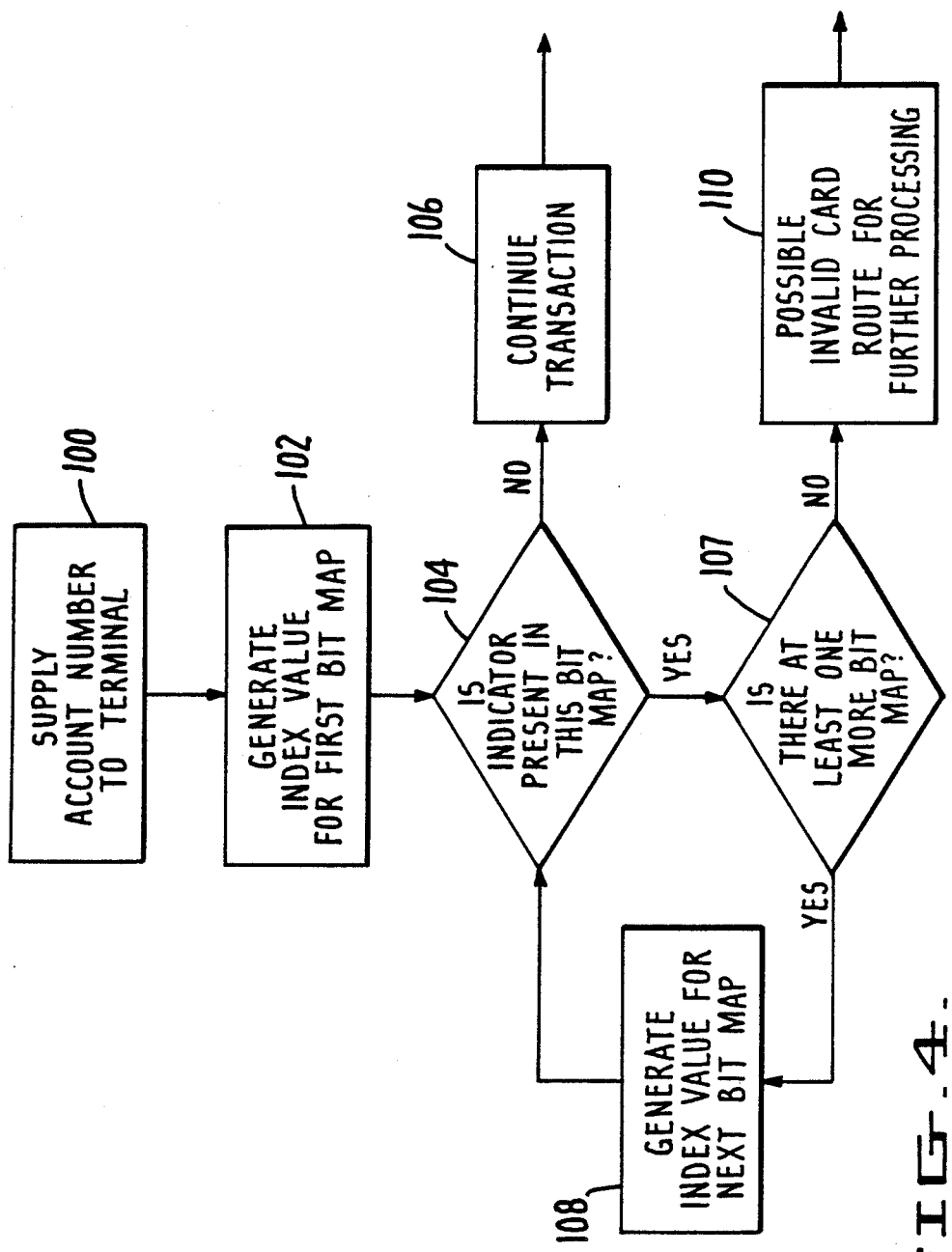
FIG. 4 is a flow chart illustrating the steps taken at the transaction terminal in accordance with the subject invention.

Having described the generation and transmission of the master table to the transaction terminals, the use of the master table at the transaction terminal will now be discussed with reference to the flow chart of FIG. 4. At the time of a purchase, a cardholder will present his transaction card to a merchant. The account number of the card is then supplied to the transaction terminal, as shown in step 100 in FIG. 4. The processor in the transaction terminal can then generate index values for each bit map in a manner exactly equivalent to the algorithms used to generate the master table.

Assuming the hashing system described above has been used to create the master table, the first digit of the first index value will be defined by whether the sum of digits in positions 4 and 5 are odd or even. The remaining five digits of the first index value will be the modulo sum of each group of three selected digits. After the first index value is generated (step 102), the processor will look into the first bit map of the master table to determine if an indicator has been placed at the location defined by the index value(step 104). If there is no indicator at that location in the first bit map, the analysis is complete and the transaction can be allowed to continue (step 106).

Step 106 is intended to represent the next set of steps to which the transaction would normally be subjected. For example, the transaction amount could be compared to a dollar limit stored either on the card as risk assessment data or in the terminal. If the transaction falls below that dollar limit it could be automatically approved right at the terminal. If the transaction limit is above that amount, the transaction information may still be sent on to the central processor for further analysis.

If an indicator is present in the first bit map, the analysis will continue for each remaining bit map. The processor will first determine if there are any bit maps remaining that have not been tested (step 107). If there are any bit maps remaining, the processor will generate the index value for the next bit map in step 108. The processor will check to determine if an indicator has been placed in the next bit map of the master table at the location defined by the newly generated index value (step 104). As noted above, if no indicator is present at that location, the card is known to be valid and the transaction can proceed. (step 106).

If indicators are present in all of the bit maps, (i.e. there are no more bit maps left to test and therefore the answer to decision step 107 is "no") there is a possibility that the card is invalid and the information must be routed for further processing as shown in step 110. In this step, an on-line connection can be established to the central processor 30. The transaction information is transmitted to the central processor where it can be further analyzed. The analysis can be made at the central processor if the list of all invalid cards is stored at that location. In the alternative, where the invalid card lists are stored at the issuers 10, the transaction can be rerouted for further analysis at the issuer. If the card is, indeed, invalid, a return message can be given to the terminal to decline the transaction. If, however, the card is valid, the transaction can be approved.

As discussed above, the subject system provides a master table with a large amount of information held in a small space. This approach described herein, however, has an additional advantage. More specifically, in order to check any card against the master file, there is no need to go through the entire table. In the system described in U.S. Pat. No. 3,696,335, where the list of actual account numbers is supplied to the terminal, the account number is compared to each of the numbers in the list in order to determine if the card is listed. Even if more sophisticated binary searching algorithms are used (where lists are arranged in numeric order), a number of comparisons are still necessary. In contrast, in the subject system, only the location in the bit map corresponding to the index value must be checked to determine if an indicator is present. The entire bit map does not have to be reviewed. In a master table having five bit maps, a determination can be made as to whether an account number is present in a universe of 100,000 invalid cards simply by looking at five locations in the master table. If any indicator is missing, the card is known to be valid.

In the pilot programs initiated by the assignee for implementing the subject invention, transmission of the master table to the remote terminals is performed on a daily basis. This high frequency of distribution permits information in the master table to be much more current as compared to the information contained in the standard printed bulletins which are distributed on a weekly basis. However, even a daily distribution will not include all of the cards known to the issuer as being invalid. For example, many cards are used almost immediately after they have been lost or stolen. Thus, even if the cardholder contacts the issuer immediately after a card has been lost or stolen, some number of hours will elapse before that information is distributed.

The omission from the master table of a card known to be invalid is not limited to the situation where there has not been sufficient time to distribute the reported information. As noted above, in national transaction card systems, invalid transactions cards are listed in the card bulletin based on the geographical region where they are most likely to be used. For example, a card reported lost or stolen in New York will generally not be listed in the bulletins distributed in California. This limitation is imposed to reduce costs and make sure the card bulletin (and now the master table) does not become unreasonably long. Unfortunately, this limitation also makes the small percentage of invalid cards that are used in an unexpected geographical region more difficult to detect.

In order to reduce the frequency of the undetected fraudulent use of a card known to be invalid, the subject system can be modified such that the master table at the local terminals is supplemented with the account numbers of any card which is used for a transaction. By this arrangement, any subsequent use of the card, at the same terminal location, will result in an identification that the card may possibly be invalid. As noted above, with reference to FIG. 4, if the card is indicated as possibly invalid it is routed for further on-line processing. If the card is listed at the issuer as being invalid, it will be detected during the on-line authorization procedure and appropriate action can be taken.

Figure 5:
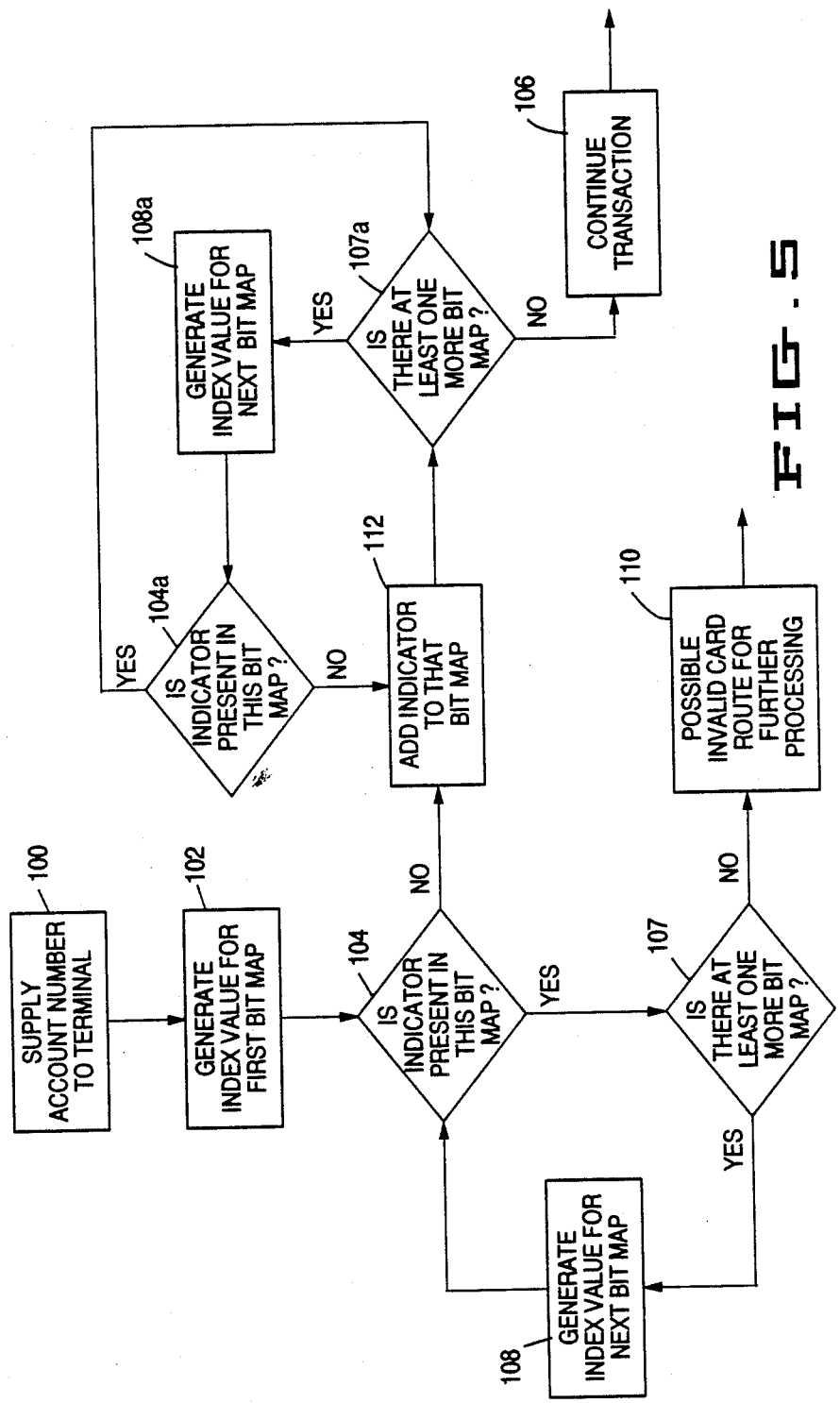
FIG. 5 is a flow chart, similar to FIG. 4, illustrating the steps taken at the transaction terminal in an alternate embodiment of the subject invention.

FIG. 5 illustrates the implementation of this additional aspect of the subject invention. The steps which are similar to FIG. 4 have like numbers and will not be discussed. To implement the subject invention, the account number is added to the master table by inserting indicators representative of the card into each of the bit maps. As noted above with reference to FIG. 4, the terminal processor is already programmed to determine if indicators are present in each of the bit maps located at addresses determined by the index values calculated in step 102. If an indicator is not present (the answer to step 104 is no) the card is presumed valid and the transaction can be continued. In conjunction with the continued processing, indicators are added to the master table as shown by the new steps illustrated in FIG. 5 and discussed immediately below. It should be noted that if the answer to step 104 is yes, an indicator is already present at the tested location and would not need to be added to the bit map. As before, if all of the bit maps have indicators (the answer to step 107 is no) then the card is considered listed and must be processed on-line as possibly invalid in step 110.

If an indicator is not present in any of the bit maps, one must be inserted. As set forth in step 112, an indicator is added to that bit map location which was just noted as vacant in step 104. In step 107a, the processor will determine if there are any bit maps remaining that have not been checked. If not, the transaction can continue in step 106. If there are additional bit maps to be checked, the next index value is generated in step 108a. The index value generated is used to address the next bit map and determine if an indicator is present in step 104a. If so, the processor will go on to check any remaining bit maps. If an indicator not present, one is added in step 112. This process will continue until all the bit maps have been checked and updated.

It should be noted that steps 104a, 107a and 108a can be performed with the identical subroutines of original steps 104, 107 and 108 respectively. Thus, the implementation of this additional inventive aspect, where indicators are placed in the calculated bit map locations, requires virtually no additional programming. When the process is complete, an indicator will be present in each of the bit map locations. Accordingly, if the card is presented for a subsequent transaction at that terminal, it will be identified as possibly invalid and routed for on-line processing.

In general, the likelihood that any particular transaction card will be legitimately used more than once at a specific terminal within a twenty-four hour period will not be particularly high. However, an invalid card is often used for multiple purchases in one location. Such a pattern has been observed in gas station transactions where this aspect of the subject invention might be particularly suitable.

Another location which may be suitable includes large retail establishments, having multiple transaction terminals. These terminals are typically linked to a master computer in the store. In this configuration, the master table of the subject invention would be stored in one location and linked to the master computer. Each of the terminals in the store (or possibly a group of stores in the same general area) are provided with direct access to the master table through the master computer.

As can be appreciated, it is quite common for a cardholder to make a purchase in one department of a store and then go to another department and make a second purchase. The act of making the first purchase in one department will cause information about the account number of the card to be entered into the master table. In this manner, when the account number is processed during the second purchase in a different department, it will be identified as possibly invalid and sent on-line for approval by the central processor.

It should be noted that it is within the scope of the subject invention that the master table be distributed to a remote site which acts as a network node for multiple terminals. This arrangement still preserves one of the features of the subject system wherein the need to communicate on-line between the remote stations and the central processor is reduced.

It should also be noted that this aspect of the subject invention can be implemented with any terminal having space to store information about account numbers of cards. Thus, even if a terminal is not equipped to operate with a data compressed master table, it may nonetheless store information representative of an account number such that a subsequent use will be identified as requiring on-line processing. Of course, when coupled with a terminal having a data compressed master table, the additional storage space necessary to add information about extra account numbers is minimized.

As can be appreciated, as account numbers are added to the master table, the percentage of valid cards identified as possibly invalid is increased. This effect is minimized by replacing the entire master table when the latest version is received at the terminal. The new master table should include any cards reported as invalid since the last update.

In order to maximize the effectiveness of the subject system, it is desirable to distribute the master table on a frequent basis. In order to distribute the file on a daily basis, some form of transmission, such as broadcasting, must be used. Unfortunately, when transmitting data, errors will occur.

Many prior art techniques have been developed to detect and correct data transmission errors. These techniques can be used to enhance the accuracy of the data transmitted as described herein. However, most error detection techniques do not give completely unambiguous information for all types of transmission errors. For example, they may give information as to which data bytes have errors but cannot identify which bits within the byte are in error. In such a case, correction may not be possible.

In the case of the subject invention, if a transmission error has occurred in the master table that is not corrected, data might be lost and a transaction card which should be identified as invalid could be approved as valid. In order to prevent this result from occurring, the subject invention provides for a unique error compensation system (as compared to an error correction system) which alters the received master table in a manner to reduce the probability that a card which had been listed as being invalid will be treated as valid.

In order to achieve this result, the subject invention provides an approach for detecting errors which have occurred during transmission. Of course, any errors which can be unambiguously identified can be corrected in accordance with prior art techniques. However, errors that are detected which cannot be pinpointed will be compensated by placing indicators in the master table at each of the suspect locations. Since an indicator in the bit map indicates a possibly invalid card, no information about invalid cards will be lost.

There are many ways for implementing such an error compensation system. In the preferred embodiment of the subject invention, standard error correction techniques are used as a basis for detecting errors. In order to appreciate the preferred embodiment, the data transmission format must first be explained. As noted above, in the preferred embodiment, the master table has one million bits of data. This master table is logically defined by 5953 blocks of data each having 21 bytes. Each byte has 8 bits of data so that there are total of 168 bits of data per block.

For data transmission purposes, these 168 bits of data are reconfigured into 24 bytes, each byte having seven bits of data and one parity check bit. Parity check bits are old and well known in the art. Briefly, the parity check bit is set such that the total number of "ones" in each byte is an odd number. If after transmission, there are an even number of ones in the byte, it can be concluded that there has been a an odd number of transmission errors in the byte. The most probable error would be a single bit error.

In addition to the 24 bytes referred to above, a 25th byte is added to the block prior to transmission. This block is called the Longitudinal Redundancy Check byte or LRC byte. LRC bytes are also known in the art. The LRC is generated by exclusive-or-ing each of the preceeding bytes together. By this arrangement, the total number of "ones" in all similar bit locations in each byte within the block (including the LRC byte) is even. The LRC can be used to provide a parity check on the bit positions in each byte in the block (as opposed to the byte parity identification provided by the parity bit). After transmission, all of the bytes, including the LRC byte, are exclusive-or-ed. If there have been no transmission errors, the result (called the block error byte) should be zero. If any of the bits in the block error byte are one, it is an indication that there has been a transmission error in that bit position in one of the bytes. The parity check and the LRC byte are used together to detect and correct certain errors and to provide compensation for other errors.

In the embodiment implemented by the assignee herein, each of transmitted blocks actually include 28 bytes. The first two bytes are used to hold an address which specifies the location of the block within the master table. Another byte is available for a cyclical redundancy check (CRC). The use of cyclical redundancy check byte is another error correction technique used in the prior art and need not be described herein since it is not used in the subject error compensation scheme. In practice, both the address bytes and the CRC byte are used in the creation of the LRC byte. It is desirable to use an odd number of bytes (in this case 27) to create the LRC byte thereby insuring that the LRC byte will have an odd parity similar to all of the data bytes.

Figure 6:
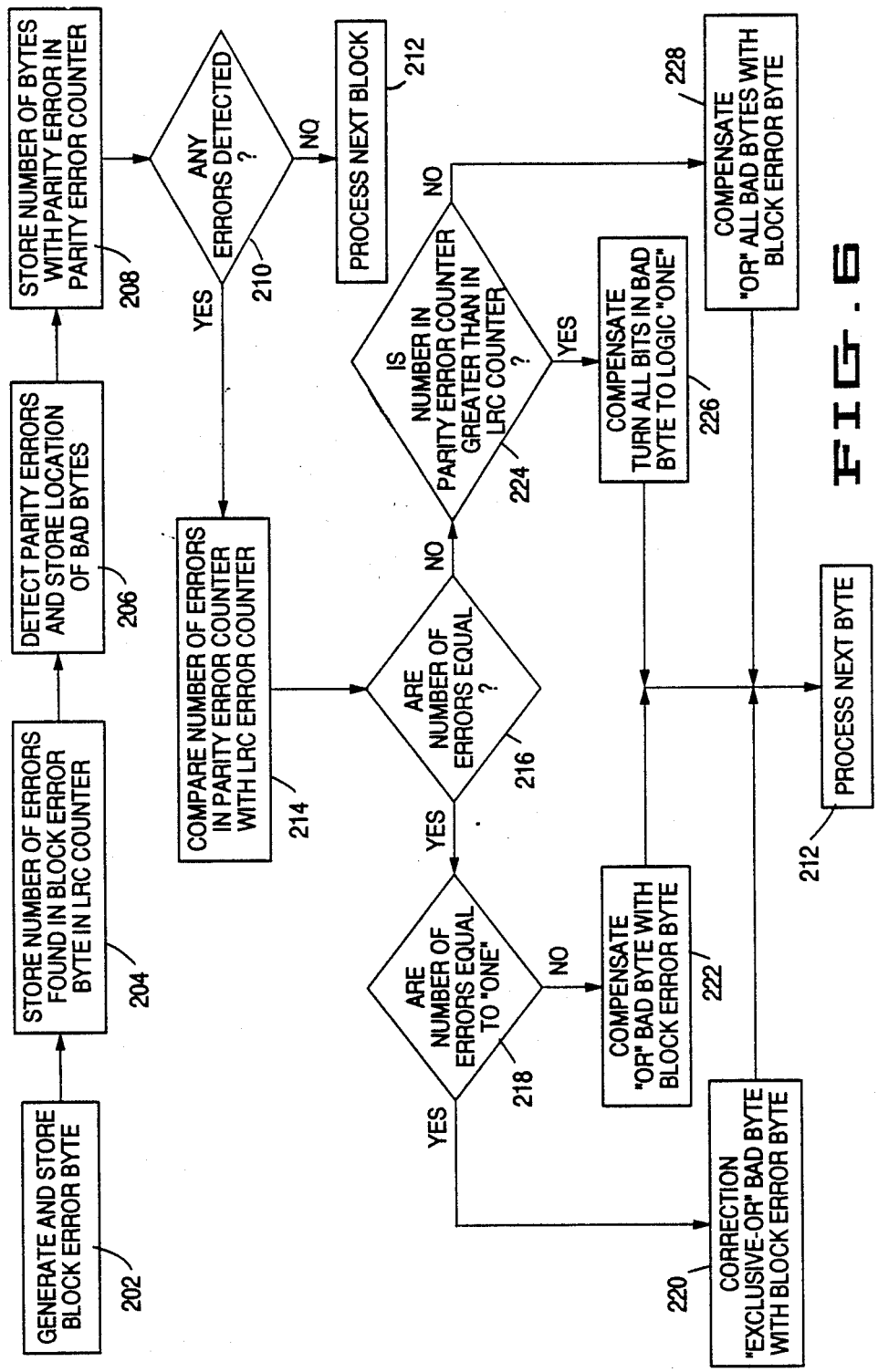
FIG. 6 is a flow chart illustrating the error compensation technique in accordance with the subject invention.

Having described the format of the transmission blocks, the error correction and compensation scheme will now be described with reference to FIG. 6. In step 202, the block error byte is generated by exclusive-oring all of the transmitted bytes. The block error byte is stored. As noted above, the contents of the block error byte should be all zeros if no errors occurred. The presence of any "ones" indicates that an error has occurred in that bit position in one of the bytes. The number of errors represented in the block error byte (the number of "ones") is stored in an LRC error counter in step 204.

In Step 206, the parity errors are identified and the location of each byte having a parity error is stored. The number of bytes with parity errors is stored in a parity error counter in step 208. As noted above, each byte should have an odd parity. If parity is even, the byte has been subject to a transmission error. Steps 202, 204 and 206, 208 can be performed in a parallel fashion, on a byte by byte basis, as the block is being received at the terminal.

If no errors are detected in step 210, the next block can be processed in step 212. If errors are detected, then the number in the parity error counter and the number in the LRC error counter are compared in step 214. In step 216, a determination is made as to whether the number in the parity error counter and the number in the LRC error counter are equal. If they are, another determination is made in step 218 as to whether both counters are equal to one. If both counters are equal to one, it is likely that there is only one error and it is located in the byte with the parity error and in the bit that is shown to be in error by the block error byte. This error can be corrected by changing the bit. This type of error correction is well known and can be performed by exclusive-or-ing the identified byte with the block error byte as set forth in step 220.

If the number in the parity error counter equals the number in the LRC error counter but they are greater than one, it is likely that there are single errors in multiple bytes. The block error byte gives information as to which bits in the bytes might be in error. However, information as to which byte has a particular bit error is incomplete. In this case, according to the error compensation scheme of the subject invention, each of the identified bits in the identified bytes are changed to 1. This can be accomplished by or-ing each of the bytes identified as having a parity error with the block error byte as shown in step 222. This step results in the placement of an indicator in each of the suspect bits. As can be appreciated, this insures that any of the bits which might have been subject to a transmission error now has an indicator, so that no information about invalid cards will be lost.

If the determination in Step 216 indicates that the number in the parity error counter and the LRC error counter are not the same, then there is a determination if the number in the parity error counter is greater than the number in the LRC error counter in step 224. If that is the case, it would indicate that multiple transmission errors combined to cancel information in the block error byte. The assumption is then made that only the parity error information is reliable. Based solely on the parity information, certain bytes can be identified as having errors but the locations of these errors within the identified byte is unknown. In this case, the compensation remedy is to turn all of the bits in each of the bad bytes to 1 as shown in step 226.

If the result of Step 224 is that the number in the parity error counter is less than in the LRC error counter, then this is an indication that an even number of errors (most probably two) occurred in a byte which cancelled the parity check. No clear information is then available as to which bytes have errors. Assuming the block error byte is valid, information is available as to bit positions where errors might have occurred, even though the byte location is unknown. The ambiguous error is compensated by setting indicators at the identified bit locations in every byte of the block. This result is achieved by or-ing the block error byte with the all of the data bytes as shown in Step 228. After all of the error correction or compensation steps have been complete, the next block can be processed in step 212.

The compensation approach set forth in steps 218, 22 and 224 all function to add indicators to the bit map. While this action reduces the possibility that information about invalid cards will be lost, the number of valid cards identified as invalid will increase. However, as noted above, a certain percentage of valid cards identified as possibly invalid and forwarded on-line for authorization is not considered a problem. It has been found that the error compensation approach described herein does not raise that percentage above a tolerable level. For example, even though step 224 could add a significant number of indicators to the table, the type of error addressed by step 224 has a fairly low probability of occurrence such that the increase in the percentage of valid cards identified as invalid will not have a significant statistical impact.

It should also be recognized that certain rare combinations of transmission errors can compensate each other and avoid detection entirely. This latter characteristic is common to error correction techniques which do not rely on redundancy transmissions to detect errors. Since one object of the subject invention is to reduce the amount of data transmitted, redundant transmissions are not desirable and should be avoided. Fortunately, these types of compensating errors are not common enough to warrant the use of error detection techniques utilizing redundant transmissions.

In summary, there has been provided a new and improved system for distributing information about invalid transaction cards. In this system, a master file is created containing less than the entire account number of the cards. The master file consists of at least one bit map having indicators corresponding to invalid cards. The location of each indicator is determined by hashing the account numbers to produce an index value which is then used as an address for supplying the indicator to the bit map. Once indicators have been placed in all the bit maps of the master table for all the invalid account numbers, the master table is then transmitted to the transaction terminals. The transaction terminals which the information in the master table to analyze pending transactions. The information in the table is arranged such that if a potentially invalid card is presented, a signal will be generated which will cause the transaction to be passed onto the central processor for further analysis. In the preferred embodiment, the table is arranged such that the probability of a valid card being identified as potentially invalid is less than ten percent and preferably on the order of one to three percent. In this manner, only a small percentage of valid transactions will be transmitted to the central processor for further analysis as a result of this scheme. During each transaction, the master table can be supplemented with information about the account number of the transaction card presented for the purchase. In this manner, any subsequent use of the card will be routed for additional processing. A scheme for compensating for data transmission errors is used to reduce the possibility that information about invalid cards is not lost when the master file is distributed.

While the subject invention has been described with reference to preferred embodiments, it is apparent that other changes and modifications could be made therein by one skilled in the art without varying from the scope and spirit of the subject invention as defined by the appended claims.

I claim:

1. An apparatus for facilitating the off line approval of transactions based upon the use of transaction cards each having an account number, comprising:
   data entry means receiving data representative of the account number of a transaction card;
   storage means storing information relating to account numbers of transaction cards; and
   processor means comparing the account number of the card presented for the transaction with the information stored in the storage means and generating an output signal based on the comparison, said processor means further functioning to store information relating to the account number of the card presented for the pending transaction in said storage means if such information had not previously existed such that a subsequent use of the card will be detected during the comparison performed by the processor means.

2. An apparatus for facilitating the off line approval of transactions based upon the use of transaction cards each having an account number comprising:
   data entry means receiving data representative of the account number of a transaction card;
   storage means storing a master table which includes data derived from a list of transaction cards, said data being less than the entire account number of each card and wherein each listed card is represented by at least one indicator; and
   processor means comparing the account number of the card presented for the transaction with the data stored in the master table and generating an output signal based on the comparison, said processor means further functioning to store data relating to the account number of the card presented for a pending transaction in said master table if such data had not previously existed such that a subsequent use of the card will be detected during the comparison performed by the processor means.

3. An apparatus for facilitating the off line approval of transactions based upon the use of transaction cards each having an account number comprising:
   data entry means receiving data representative of the account number of a transaction card;
   storage means storing a master table which includes data derived from a list of transaction cards, said master table being defined by a plurality of bit maps and wherein each listed card is represented by one indicator in each bit map, each said indicator corresponding to an index value which is an algorithmic function of a set of digits in the account number of the transaction card; and
   processor means comparing the account number of the card presented for the transaction with the data stored in the master table and generating an output signal based on the comparison, said processor means further functioning to store data relating to the account number of the card presented for a pending transaction in said master table if such data had not previously existed such that a subsequent use of the card will be detected during the comparison performed by the processor means.

4. A method of operating an apparatus for facilitating the off line approval of transactions based upon the use of transaction cards each having an account number, said apparatus having a means for storing information relating to account numbers of said cards, comprising the steps of:
   comparing the account number of the card presented for a transaction with the stored information about account numbers;
   generating an output signal based upon the outcome of the comparison; and
   storing information about the account number of the card presented for the transaction if such information had not previously existed such that a subsequent use of the card will be detected during said comparison step.

5. A method of operating an apparatus for facilitating the off line approval of transactions based upon the use of transaction cards each having an account number, comprising the steps of:
   storing a master table which includes data derived from a list of transaction cards, said data being less than the entire account number of each card and wherein each listed card is represented by at least one indicator;
   comparing the account number of the card presented for the transaction with the data stored in the master table;
   generating an output signal based upon the outcome of the comparison; and
   storing data about the account number of the card presented for the transaction in the master table if such data had not previously existed such that a subsequent use of the card will be detected during said comparison step.

6. A method of operating an apparatus for facilitating the off line approval of transactions based upon the use of transaction cards each having an account number, comprising the steps of:
   storing a master table which includes data derived from a list of transaction cards, said master table being defined by a plurality of bit maps and wherein each listed card is represented by one indicator in each bit map, each said indicator corresponding to an index value which is an algorithmic function of a set of digits in the account number of the transaction card;
   comparing the account number of the card presented for the transaction with the data stored in the master table;
   generating an output signal based upon the outcome of the comparison; and
   storing data about the account number of the card presented for the transaction in the master table if such data had not previously existed such that a subsequent use of the card will be detected during said comparison step.

7. In a transaction network including a central processor, a plurality of remote transaction terminals and a plurality of transaction cards, each card having an account number associated therewith, a method for identifying certain cards in an off-line manner comprising the steps of:
   (a) generating information about certain cards from a list maintained at the central processor;

(b) distributing said information about the listed cards in a manner to be locally accessed by the remote transaction terminals;
(c) comparing the account number of the card presented for the transaction with the distributed information about listed cards;
(d) generating a signal based on the outcome of the comparison; and
(e) storing information about the account number of the card presented for the transaction if such information had not previously existed such that a subsequent use of the card will be detected during said comparison step.

8. In a transaction network including a central processor, a plurality of remote transaction terminals and a plurality of transaction cards, each card having an account number associated therewith, a method for identifying certain cards in an off-line manner comprising the steps of:
(a) generating a master table at said central processor, said table including data derived from a list of transaction cards, said data being less than the entire account number of each card and wherein each listed card is represented by at least one indicator;
(b) distributing the master table in a manner to be locally accessed by the transaction terminals;
(c) comparing the account number of the card presented for the transaction with the data in the distributed master table;
(d) generating a signal based on the outcome of the comparison; and
(e) storing data about the account number of the card presented for the transaction in the master table if such information had not previously existed such that a subsequent use of the card will be detected during said comparison step.

9. In a transaction network including a central processor, a plurality of remote transaction terminals and a plurality of transaction cards, each card having an account number associated therewith, a method for identifying certain cards in an off-line manner comprising the steps of:
(a) generating a master table at said central processor, said table including data derived from a list of transaction cards, said master table being defined by a plurality of bit maps and wherein each listed card is represented by one indicator in each bit map, each said indicator corresponding to an index value which is an algorithmic function of a set of digits in the account number of the transaction card;
(b) distributing the master table in a manner to be locally accessed by the transaction terminals;
(c) comparing the account number of the card presented for the transaction with the data in the distributed master table;
(d) generating a signal based on the outcome of the comparison; and
(e) storing data about the account number of the card presented for the transaction in the master table if such information had not previously existed such that a subsequent use of the card will be detected during said comparison step.

* * * * *